United States Patent [19]

Schave

[11] Patent Number: 4,808,799
[45] Date of Patent: Feb. 28, 1989

[54] CRACK DETECTING WINDOW PANEL AND METHOD OF PRODUCING SAME

[75] Inventor: Richard D. Schave, Perrysburg, Ohio

[73] Assignee: Libbey-Owens-Ford Co., Toledo, Ohio

[21] Appl. No.: 118,238

[22] Filed: Nov. 9, 1987

[51] Int. Cl.⁴ .............................................. H05B 3/06
[52] U.S. Cl. .................................. 219/522; 219/203
[58] Field of Search ............... 219/552, 547, 509, 203, 219/218, 522

[56] References Cited

U.S. PATENT DOCUMENTS

| | | | |
|---|---|---|---|
| 3,760,157 | 9/1973 | Newman et al. | 219/522 |
| 3,876,862 | 4/1975 | Newman et al. | 219/522 X |
| 3,892,947 | 7/1975 | Strengholt | 219/522 |
| 3,941,975 | 3/1976 | Newman et al. | 219/522 X |
| 3,974,359 | 8/1976 | Orcutt et al. | 219/522 |
| 4,725,710 | 2/1988 | Ramus et al. | 219/203 |

FOREIGN PATENT DOCUMENTS 0219273  4/1987  European Pat. Off. .

Primary Examiner—E. A. Goldberg
Assistant Examiner—M. M. Lateef
Attorney, Agent, or Firm—Marshall & Melhorn

[57] ABSTRACT

A heated window assembly for a vehicle includes a pair of spaced apart bus bars connected by a conductive film. A sense line is connected to one of the bus bars to monitor and compare the voltage applied to the bus bar. A control circuit connected to the sense line detects a difference in voltage in the bus bar as compared to a reference voltage and disconnects the bus bars from the vehicle power supply.

24 Claims, 3 Drawing Sheets

CRACK DETECTING WINDOW PANEL AND METHOD OF PRODUCING SAME

BACKGROUND OF THE INVENTION

The present invention concerns a crack detecting window panel assembly and method for producing same, and in particular, a method for monitoring and interrupting power applied to an electrically heated window glass.

Motor vehicles of recent manufacture are being equipped with electrically heated window panel assemblies, i.e., windshields, for defogging and deicing the windows. These electrically heated windshields are becoming increasingly popular, not only due to the convenience they afford the driver with rapid deicing and defogging, but also from the the enhanced safety they afford in the vehicle's operation. These electrically conductive windshields typically draw 5 to 35 amperes of electric current at 12 to 100 volts during heating depending upon the method and materials used in their construction. With these high levels of electrical current consumption, potential problems due to fractures in the window exist.

One possible problem which arises is the potential for electric shock to an individual coming into contact with a fractured windshield and receiving an electrical shock due to power still being applied to the electrically conductive panel.

Another problem is the possibility of local ignition and flame due to an arcing which may occur when a fracture exists in the electrically conductive panel.

Yet another possible problem is the potential for a motor vehicle accident due to startling the driver with the electric arc from the fractured window and then the driver losing control of the vehicle.

Prior artisans have developed crack detectors which have concentrated on two avenues of methodology for circuit interruption. These methods have involved resistance level detection or continuity loops to indicate when a crack has formed in the windshield. An example of one of the resistance measuring type of systems is shown in U.S. Pat. No. 4,565,919, in which the circuit includes structure for monitoring the resistance of the conductive element and interrupting the power applied thereto when the resistance of the conductive element assumes a value indicative of the element being fractured. In another example of the type in which a continuity loop is used, as shown in U.S. Pat. No. 3,941,975, a sensing circuit which includes a frangible strip is disposed in a predetermined pattern on a panel. When the panel fractures, one or more cracks propagate across the frangible sensing circuit to interrupt the same for deenergizing the electrically conductive panel. Finally, U.S. Pat. No. 3,892,947 discloses an electrically heated, frangible panel especially adapted to prevent electrical shocks after fracture or breakage. An electric current conductive strip is adhered in the marginal band and extends around an electrically conductive coating before contacting an edge thereof. Upon fracture or breakage of any portion of the panel, the conductive strip severs preventing current flow through the coating.

SUMMARY OF THE INVENTION

The present invention concerns a novel method for interrupting the power to an electrically conductive panel upon detection of a crack in same. Essentially, a voltage sensing circuit is provided for the electrically conductive panel which consists of a voltage sense line and bus bars which are silk screened onto a major surface of a glass sheet or onto a ceramic enamel band applied to the major surface of the glass sheet either prior to or subsequent to the application of an electrically conductive film. The bus bars and the voltage sense line are inter-connected during a silk screening process, and are typically formed of a silver frit material. The glass sheet is heated to fire the voltage sense line and bus bars into place. The electrically conductive film is applied to the same surface of the glass panel. The electrically conductive film is applied to allow contact with the bus bars to form a complete electrical circuit. The filmed panel is typically assembled to an intermediate plastic sheet and ultimately to a second glass panel to form a laminated window assembly.

The crack detecting window assembly in accordance with the present invention interrupts power upon detection of a fracture of said window assembly by sensing differential voltage levels between a selected bus bar and the sense line. Upon detection of a fracture of the selected bus bar or the sense line, the voltage of either the bus bar, or the sense line will deviate from the norm, and the electrical circuit will be interrupted to prevent the problems usually associated with fractured electrically conductive windows. The interruption of the power is accomplished via a voltage sensing circuit provided in the motor vehicle electrical system. The sense line is connected to an upper bus bar near the side edge of the window assembly, which is the area where crack shut down is needed due to the high current level being carried by the bus bar. The present invention has the advantage of requiring only three electrical connections to the window assembly whereas most prior art devices require four connections.

BRIEF DESCRIPTION OF THE DRAWINGS

The above, as well as other advantages of the present invention, will become readily apparent to those skilled in the art from the following detailed description of a preferred embodiment thereof when considered in the light of the accompanying drawings in which.

DESCRIPTION OF THE PREFERRED EMBODIMENT

Figure 1:
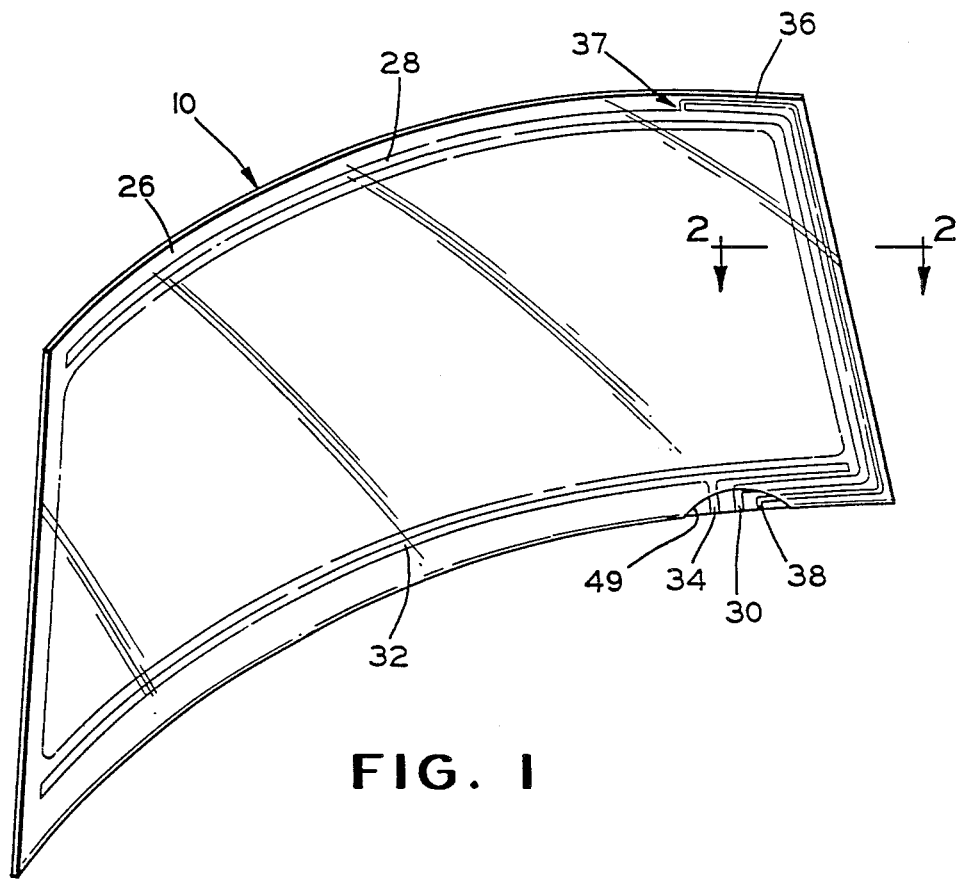
FIG. 1 is a perspective view of a windshield assembly according to the present invention.
Figure 2:
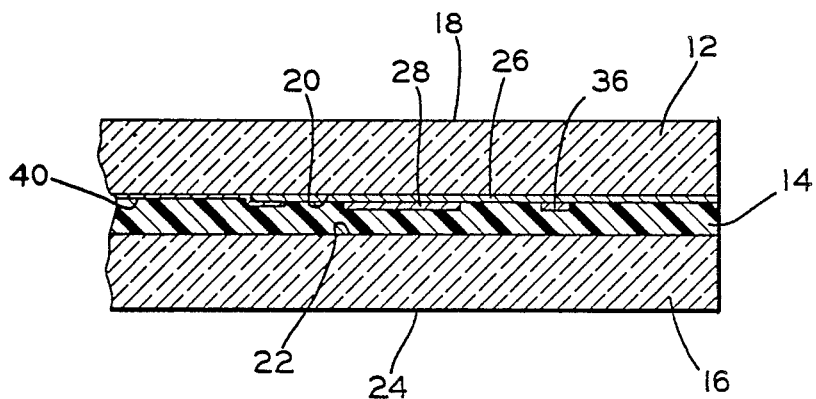
FIG. 2 is an enlarged cross-sectional view taken along the line 2—2 of FIG. 1.
Figure 3:
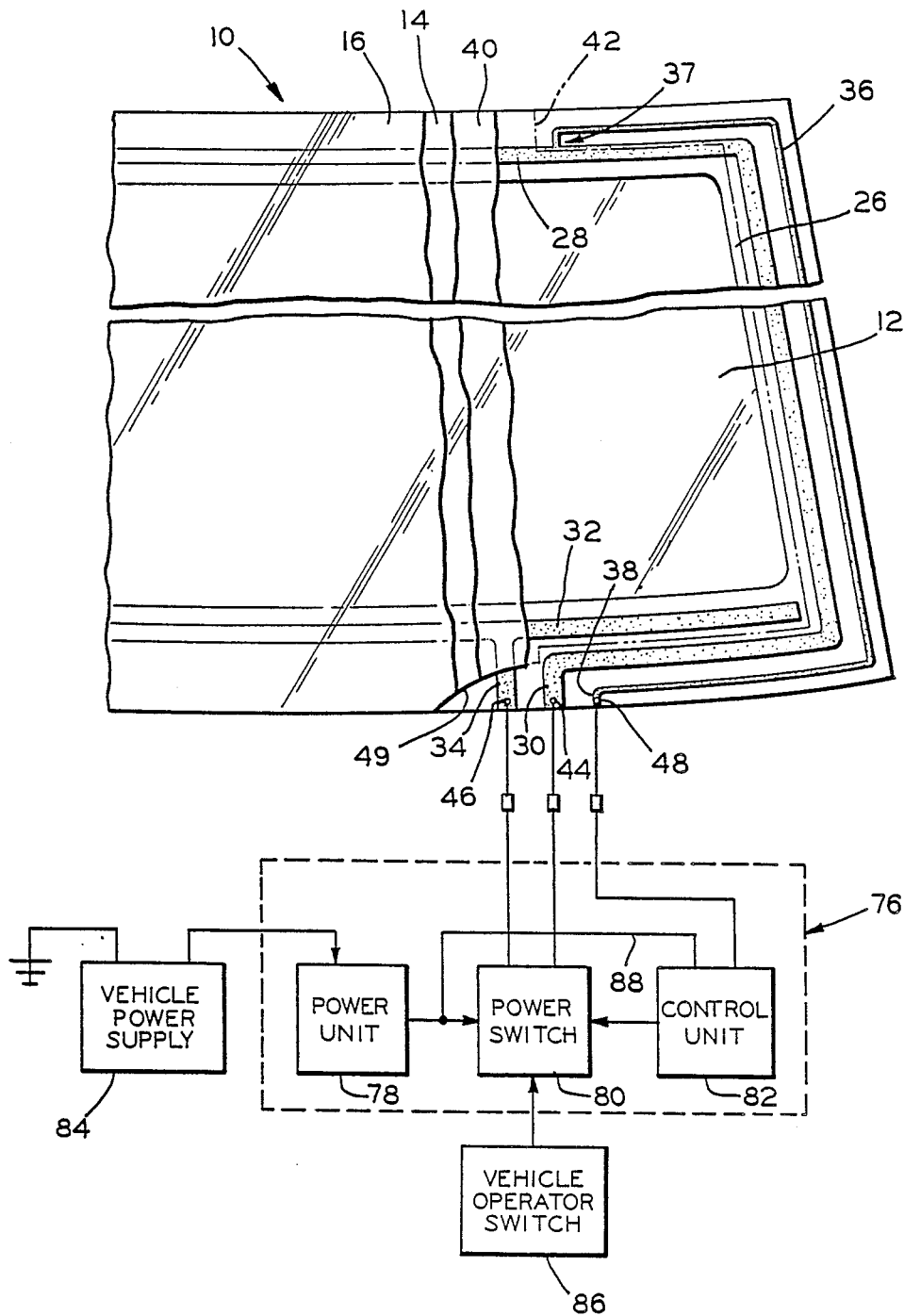
FIG. 3 is an enlarged fragmentary plan view of a portion of the windshield assembly shown in FIG. 1.

FIGS. 1—3 show an electrically conductive windshield in accordance with the present invention. The windshield, indicated generally at 10, includes an outboard sheet of glass 12, an intermediate sheet of plastic material 14, for example composed of a polyvinyl butyral or polyester material, and an inboard sheet of glass 16 all laminated together under heat and pressure to produce an integral unit. For purposes of reference, the surfaces of the glass sheets 12 and 16 are typically designated as first through fourth surfaces. Thus, an outer surface 18 of the outboard glass sheet 12 is the number one or first surface. An inner surface 20 of the outboard glass sheet 12 is the number two or second surface; an inner surface 22 of the inboard glass sheet 16 is the number three or third surface; and an outer surface 24 of the inboard glass sheet 16 is the number four or fourth surface.

Typical of the structure of electrically heated windshields used in current motor vehicles, a film of electrically conductive material extends between a pair of spaced bus bars located along opposed edges of a windshield. From the aesthetic standpoint, it is desirable to shield or hide the bus bars from view outside the windshield. Typically, this is accomplished by applying a peripheral band 26 of opaque ceramic enamel material, usually through a silk screening process, to the second surface 20. After the band 26 has been applied and dried, a pair of bus bars are applied on top of the band. An upper bus bar 28 extends across the upper periphery of the windshield assembly 10, down one side of the windshield and along a portion of the bottom of the windshield before terminating in an electrical lead connector 30. A lower bus bar 32 extends across the lower periphery of the windshield assembly 10 on the band 26 and has an electrical connector section 34 formed therewith. At the same time that the bus bars are applied in place, a sense line 36 is also applied outboard of and adjacent to the upper bus bar 28. The sense line 36 is connected to the upper bus bar 28 at a predetermined location, for example, at the right side of the upper periphery near the front or "A" pillar of a vehicle as illustrated at 37 in FIG. 1. The location at which the sense line 36 attaches to the bus bar will determine the amount of area in which a crack can be detected in the electrically conductive windshield 10 and the location can be moved in order to detect larger or smaller areas. The sense line 36 extends along the bottom portion of the windshield before terminating in electrical lead connector section 28. The bus bars 28 and 32, and the sense line 36 can be formed of the same silver frit material which is typically silk screened in the desired pattern in a single process operation either onto the glass sheet or onto the ceramic band 26. This outboard glass sheet subassembly is then heated to fire the bus bars and sense line and also to complete the fusing of the band 26 if this is not accomplished in the drying step. At the same time, the sheet can be bent to the desired shape for the windshield utilizing press or gravity bending.

After the outboard glass sheet has been shaped, an electrically conductive film 40 is applied to the second surface 20. Typically, the film 40 is formed by sputtering techniques and comprises dielectric-metal-dielectric layers, having optical properties suitable for heated windshields as is well known in the art. As examples of such films and methods of applying same, reference is made to European Patent Application No. 0 219 273, published Apr. 22, 1987. The film 40 is connected, e.g., overlaps, along its upper edge to the upper bus bar 28 and is connected along its lower edge to the lower bus bar 32. As shown in FIG. 3, the edges of the conductive film can extend onto the band 26, but must not contact that portion of the upper bus bar 28 which runs down the side of the windshield assembly, nor can it contact any portion of the sense line 36 in order to avoid establishing an unwanted electrical circuit. Thus, the portions of the bus bar 28 along the side periphery and the lower periphery of the glass sheet 12, along with the entire sense line 36 must be masked prior to the applications of the conductive film 40 with a masking material 42 such as a tape or spray coating for example, or any other masking material which prevents the film 40 from being deposited during the coating process (FIG. 3). The masking material 42, shown outlined in phantom line, can be removed after the film 40 is applied, or left in place to become part of the window assembly 10. Three electrical leads 44, 46 and 48 can be attached to the connector sections 30, 34 and 38 respectively for connection to the vehicle's electrical and crack detection systems upon installation of the windshield assembly. In order to expose the connector sections 30, 34 and 38 and provide for good solder strength, the conductive film 40 and the mask 42 must not cover the sections 30, 34, 38 and a cutout portion 49 of the glass sheet 16 and intermediate sheet 14 must be removed as shown in FIG. 3.

Figure 4:
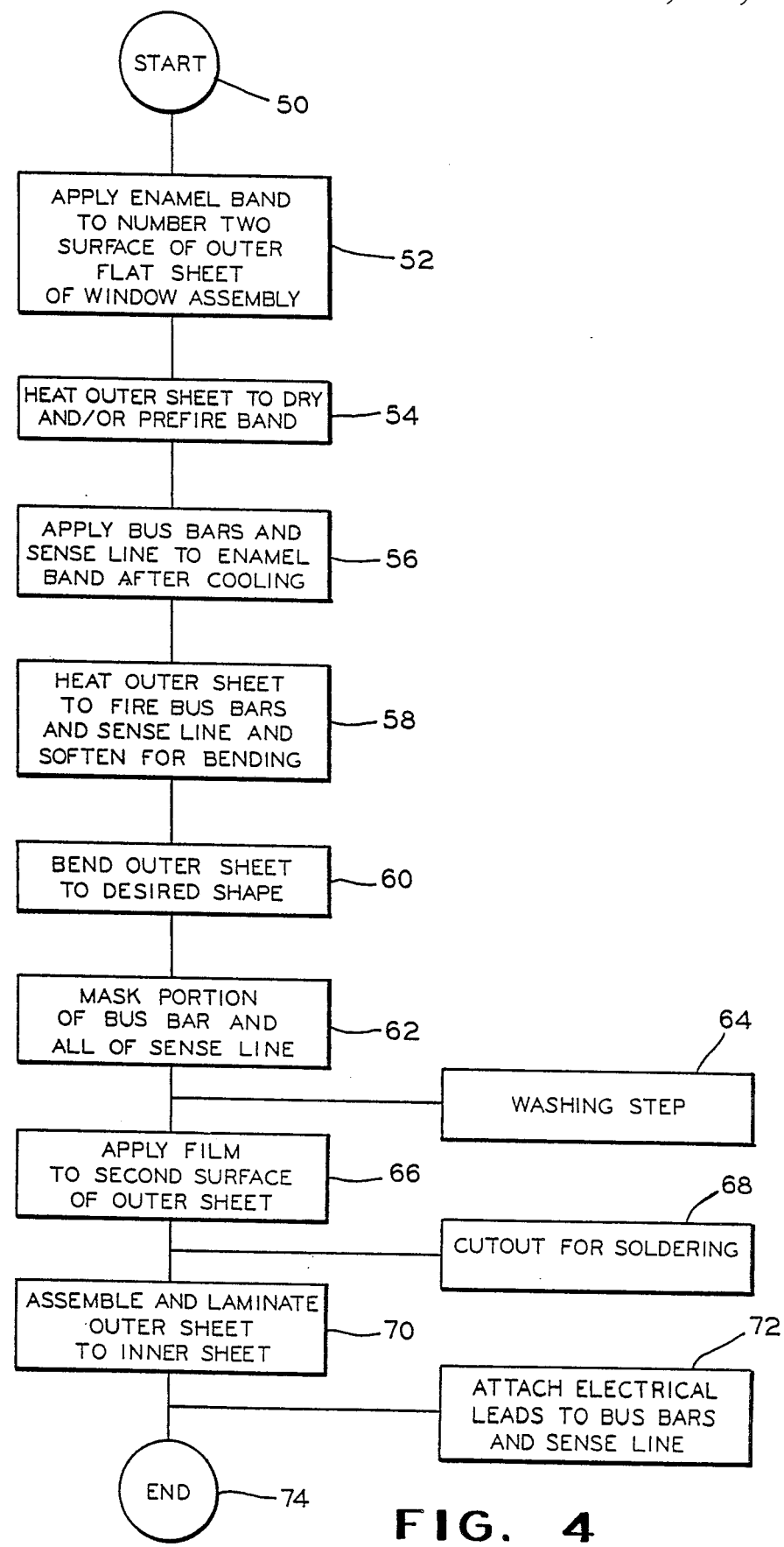
FIG. 4 is a flow diagram of a method of producing an electrically heated windshield assembly with a voltage sensing circuit according to the present invention.

The method according to the present invention for producing a crack detecting windshield assembly 10 is shown in flow diagram form in FIG. 4. The process starts as illustrated at 50 and enters a first step 52 wherein the enamel band 26 is applied to the number two surface of the outer flat sheet 12 of the window assembly. The next step 54 in the process is to heat the outer sheet 12 by exposing same to a temperature not exceeding 500° F. for from two to eight minutes to dry the band, or the temperature may be elevated to a range of 900° F. to 1250° F. to prefire the band 26. A third step 56 in the process is to apply the bus bars 28 and 32 and the sense line 36 to the enamel band 26 after the outer sheet 12 has cooled sufficiently. Typically, the bus bars and sense line are formed of a silver material, for example "Silver Paste", obtained from E.I. duPont De Nemours and Co. under the trade designation "No. 9999", which is silk screened onto the enamel band 26.

A fourth step 58 in the process is to heat the outer sheet 12 by subjecting it to a temperature in the range of 900° F. to 1250° F. for a period of two to eight minutes to fire the bus bars 28 and 32 and the sense line 36, complete, if necessary, the firing of the enamel band 26, and soften the sheet for bending. While the outer sheet 12 is heated, a fifth step 60 is performed wherein the sheet is bent to the desired shape for the final windshield assembly 10. A sixth step 62 in the process is to mask portions of the bus bar 28 and the entire sense line 36 with the masking material 42 to prevent an unwanted electrical circuit in the final window assembly 10. A seventh step 64 is performed between steps 62 and 66 whereby a washing operation removes any materials emitted during the prefiring step 54 and the firing step 58. An eight step 66 is to apply the conductive film 40 to the number two surface of the outer sheet. At this point the mask 42 coated with the film 40 can be removed if desired. A tenth step 70 in the process is to assemble and laminate the outer sheet 12 to an inner sheet of glass 16 which has been bent to the desired shape i.e., to match the outer sheet. Typically, the lamination is achieved utilizing an intermediate sheet of plastic material, i.e., polyvinyl butyral. The process is then completed, as illustrated at circle 74.

In order to expose the connector sections 30, 34 and 38 for subsequent soldering to the ends of the electrical leads 44, 46 and 48, a section of the inner glass sheet 16 and any intermediate plastic sheet must be cut away. Thus, a ninth step 68 is shown to indicate that the operations of forming the cutout 49 and for soldering can be performed between steps 66 and 70. It should be noted that the ninth step 68 can be eliminated through the use of a previously notched inner glass sheet 16 and a previously notched intermediate layer 14. Also shown in FIG. 4 is an eleventh step 72 wherein electrical leads are attached to the bus bars and sense line. These electrical leads interface with a vehicle circuit 74 (shown in FIG. 3) for providing power to the electrically conductive windshield, and in particular to the present invention, and for monitoring voltage and interrupting power upon detection of a fracture in the windshield.

In operation, the windshield assembly 10 is supplied with electric power to the bus bars 28 and 32 on the leads 44 and 46 by the vehicle power and control circuit 76. Typically, the vehicle operator positions a switch in the vehicle in the on position thereby applying voltage to the bus bars 28 and 32 and current flows in the conductive film 40 in the windshield assembly 10. As the current flows in the windshield assembly 10 through the bus bars 28 and 32, the conductive film 40 heats and transfers the heat energy by the conductive process through the components making up the windshield assembly 10 thereby deicing and defogging the window assembly.

The vehicle circuit 76 includes a power unit 78, a power switch 80 and a control unit 82. The power unit receives power, either A.C. or D.C., from a vehicle power supply 84 such as a battery and an alternator. If the heated window is to be excited with a voltage higher than that available from the vehicle power supply 84, the power unit 78 steps up the magnitude of the voltage by any conventional device which can also include current and voltage limiting means. The electrical power from the power unit 78 is applied to the leads 44 and 46 through the power switch 80. A vehicle operator switch 86, typically located within reach of the driver, is connected to the power switch 80 to manually control the application of power to the window assembly 10. The control unit 82 is connected to the lead 48 to receive the sense line voltage and is connected to the power switch 80 input by a line 88 to receive the power unit output voltage as a reference. When the voltage on the sense line 36 falls more than a predetermined amount below the magnitude of the power unit voltage, the control unit 82 signals the power switch 80 to disconnect the power from the leads 44 and 46.

During the heating operation of the window assembly, the vehicle power and control circuit 76 is constantly monitoring and comparing the magnitude of voltage being supplied to the upper bus bar 28 and the sense line 36 with the reference voltage value. Upon the formation of a crack in the upper bus bar 28 or the sense line 36, between the location 37 and the leads 44 or 48, the unit 76 senses a voltage difference and interrupts the power being supplied to the window assembly 10. The formation of a crack in the window assembly severs the upper bus bar 28 or the sense line 36 causing the voltage on the line 36 to drop. The vehicle circuit 76 detects a differential in the voltage being supplied to the severed bus bar 28 or the sense line 36 and immediately interrupts the power to the window assembly 10. Prior systems for crack detection have allowed a period of time before the power to the electrically conductive panel would be interrupted upon formation of a fracture, thereby allowing arcing across the break, and possible healing of the break due to a welding effect. In accordance with the present invention, the above described system instantaneously interrupts the power being supplied to the panel, which provides additional safety and protection for the vehicle operator.

The vehicle circuit 76 is normally supplied by the vehicle manufacturer, however, any commercially available circuit for monitoring and sensing differential voltage can be used with the present invention.

In an alternative embodiment from that described above, the conductive coating can be applied prior to the shaping process of the window assembly. The use of a pyrolitic conductive coating for example, allows for bending of conductive coating along with the glass sheet, thereby allowing the coating to be applied to the glass sheet while still flat and prior to bending.

In another embodiment, the conductive film can be applied to alternative surfaces of the conductive panel. For example, the conductive film may be applied to one of the surfaces of the plastic interlayer, on a plastic sheet forming an anti-lacerative shield or laceration shield surface, see for example U.S. Pat. Nos. 4,107,366 or 4,242,403, or on any number of surfaces within the window assembly. If the conductive film is to be applied to a plastic sheet rather than a glass sheet, then the bus bars 28 and 32, and the sense line 36 normally would be formed from an electrically conducting polyester material for example. The polyester material bus bars and sense line would then be attached to the plastic layer by gluing or the like prior to the application of the conductive film on the plastic layer. The plastic layer can then be adhered to a glass sheet, another plastic sheet or any other suitable transparent material, thereby allowing for a crack detecting laceration shield type panel, which can be a bi-layer or any other conventional window panel.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A window assembly adapted to be electrically heated, comprising:
    (a) a first transparent sheet having a major surface;
    (b) a pair of spaced apart bus bars overlaid on and adhered to said major surface of said first sheet and each having a connector section adapted to be connected to an electrical power supply;
    (c) a transparent electrically conductive film adhered to said major surface and electrically connected between said bus bars;
    (d) at least one sense line overlaid on and adhered to said major surface, said sense line being connected to one of said bus bars at a predetermined location spaced from said connector section of said one bus bar for sensing a voltage applied to said one bus bar and said sense line adapted to be connected to a device for controlling an electrical power supply connected to said bus bars; and
    (e) a second transparent sheet adhered to said first transparent sheet.

2. A window assembly adapted to be electrically heated, comprising:
    (a) a first transparent sheet having a major surface;
    (b) a pair of spaced apart bus bars overlaid on and adhered to said major surface of said first sheet and adapted to be connected to an electrical power supply;
    (c) a transparent electrically conductive film adhered to said major surface and electrically connected between said bus bars;

(d) a sense line overlaid on and adhered to said major surface, one end of said sense line being connected to one of said bus bars intermediate opposite ends of said one bus bar for sensing a voltage applied to said one bus bar and an opposite end of said sense line adapted to be connected to a device for controlling an electrical power supply connected to said bus bars;

(e) an intermediate layer of an adhesive material adhered over said major surface of said first sheet and said film; and (f) a second transparent sheet adhered to said intermediate layer.

3. A window assembly according to claim 2, wherein said adhesive material is a preformed plastic layer.

4. A window assembly adapted to be electrically heated, comprising:

(a) a first outer transparent sheet having an inner major surface;

(b) a pair of spaced apart bus bars overlaid on and adhered to said major surface of said first sheet and each having a connector section adapted to be connected to an electrical power supply;

(c) a transparent electrically conductive film adhered to said major surface and electrically connected between said bus bars;

(d) at least one sense line overlaid on and adhered to said major surface, said sense line being connected to one of said bus bars at a predetermined location spaced from said connector section of said one bus bar for sensing a voltage applied to said one bus bar and said sense line adapted to be connected to a device for controlling an electrical power supply connected to said bus bars;

(e) an intermediate layer of plastic material adhered over said major surface of said first sheet and said film; and (f) a second inner transparent sheet adhered to said intermediate layer.

5. The window assembly according to claim 4 wherein said first and second sheets are formed of a glass material.

6. The window assembly according to claim 4 wherein said intermediate layer is formed of a polyvinyl butyral material.

7. The window assembly according to claim 4 wherein said intermediate layer is formed of a polyester material.

8. The window assembly according to claim 4 wherein said bus bars and said sense line are formed of a silver material.

9. The window assembly according to claim 4 wherein a portion of said one bus bar extends along an upper edge of said first sheet and a portion of another of said pair of bus bars extends along a lower edge of said first sheet, and said film is connected between said bus bar portions.

10. The window assembly according to claim 4 including a band of opaque material adhered to said major surface and wherein said bus bars and said sense line are adhered to said band.

11. The window assembly according to claim 10 wherein said band is formed of a ceramic enamel material.

12. The window assembly according to claim 4 wherein an insulating masking material is located between a portion of said one bus bar and said film.

13. The window assembly according to claim 4 wherein an insulating masking material is located between said sense line and said film.

14. The window assembly according to claim 4 wherein a portion of each of said film, said intermediate layer and said second sheet are cut away to expose said connector section of each of said bus bars and a connector section of said sense line.

15. The window assembly according to claim 14 including an electrical lead connected to each of said connector selections of said bus bars and said sense line.

16. A vehicle window assembly adapted to be electrically heated from a vehicle power supply, comprising:

(a) an outer glass sheet having an inner major surface;

(b) an opaque band adhered to a peripheral portion of said major surface;

(c) an upper bus bar adhered to said band and extending from a lower edge of said outer sheet along a side edge and an upper edge of said outer sheet;

(d) a lower bus bar adhered to said band and extending along said lower edge of said outer sheet;

(e) a sense line adhered to said band and extending generally parallel to said upper bus bar, one end of said sense line being electrically connected to said upper bus bar between opposite ends of said upper bus bar;

(f) an electrically condcutive film adhered to said major surface over said band, said bus bars, and said sense line;

(g) an intermediate layer of plastic material adhered to said film;

(h) an inner glass sheet adhered to said plastic material layer; and (i) three electrical leads each connected to an associated one of said bus bars and said sense line adjacent said lower edge of said outer sheet.

17. The window assembly according to claim 16 wherein a portion of each of said film, said intermediate layer and said inner glass sheet are cut away to expose said connections of said leads.

18. The window assembly according to claim 16 including a power switch connected between a vehicle power supply and a pair of said leads connected to said bus bars.

19. The window assembly according to claim 18 including control means connected between a one of said leads connected to said sense line and said power switch for actuating said power switch to disconnect said bus bars from said vehicle power supply in response to a predetermined voltage drop on said sense line.

20. The window assembly according to claim 16 including an insulating mask positioned over said sense line and over a portion of said upper bus bar adjacent said side edge and said lower edge of said outer sheet.

21. A method of manufacturing an electrically heated window assembly comprising the steps of:

(a) providing an outer transparent sheet having an inner major surface;

(b) applying an opaque ceramic enamel material in a band around a periphery of said major surface;

(c) adhering a pair of bus bars and a sense line to said band, a lower one of said bus bars formed along a lower edge of said outer sheet, an upper one of said bus bars formed along an upper edge and one side edge of said outer sheet, and said sense line formed between said upper bus bar and said side edge;

(d) applying an insulating mask over said sense line and over a portion of said upper bus bar adjacent said sense line;
(e) applying an electrically conducting film over said major surface, said band, and said bus bars;
(f) adhering an intermediate plastic layer to said film; and
(g) adhering an inner transparent sheet to said intermediate layer.

22. The method according to claim 21 including a step of forming a cutout in said inner sheet, said intermediate layer and said film to expose a connector section of each of said bus bars and said sense line.

23. The method according to claim 22 including a step of attaching a separate electrical lead to each of said connector section.

24. The method according to claim 21 including performing a step of removing said insulating mask between said steps (e) and (f).

* * * * *